United States Patent [19]

Persson

[11] 4,375,297
[45] Mar. 1, 1983

[54] QUICK COUPLING DEVICE

[75] Inventor: John Persson, Grödinge, Sweden

[73] Assignee: Nolek System AB, Norsborg, Sweden

[21] Appl. No.: 217,018

[22] PCT Filed: Mar. 26, 1980

[86] PCT No.: PCT/SE80/00089
   § 371 Date: Dec. 25, 1980
   § 102(e) Date: Nov. 19, 1980

[87] PCT Pub. No.: WO80/02316
   PCT Pub. Date: Oct. 30, 1980

[30] Foreign Application Priority Data

Apr. 25, 1979 [SE] Sweden ................... 7903650

[51] Int. Cl.³ .............................................. F16L 25/00
[52] U.S. Cl. ...................................... 285/12; 285/38; 285/101
[58] Field of Search .............. 285/95, 101, 96, 12, 285/DIG. 21, 375, 38

[56] References Cited

U.S. PATENT DOCUMENTS

| | | |
|---|---|---|
| 664,341 | 12/1900 | Trommlitz et al. |
| 2,154,526 | 4/1939 | Parkerton . |
| 2,712,458 | 7/1955 | Lipson ................... 285/101 |
| 2,819,733 | 1/1958 | Maisch ............... 285/375 X |
| 3,291,442 | 12/1966 | Cranage ............. 285/101 X |
| 3,727,952 | 4/1973 | Richardson ............ 285/101 |
| 4,227,721 | 10/1980 | Reedy et al. ............ 285/96 |

FOREIGN PATENT DOCUMENTS

| | | |
|---|---|---|
| 1525984 | 9/1969 | Fed. Rep. of Germany . |
| 308641 | 2/1969 | Sweden . |
| 7704191 | 11/1978 | Sweden . |
| 992347 | 5/1965 | United Kingdom . |

*Primary Examiner*—Dave W. Arola

[57] ABSTRACT

Figure 1:
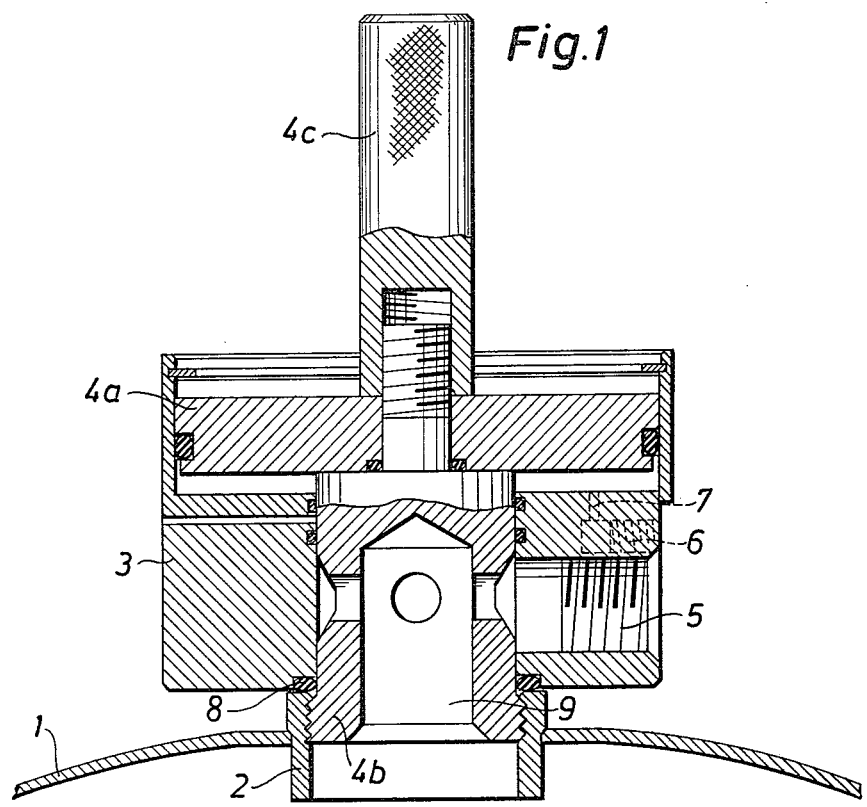

A quick coupling device for fluid tight, especially temporary connection to a threaded pipe nipple (2) or the like, e.g. for use in tightness tests or leak detection. The device comprises two portions which are axially movable relative to each other, namely a cylindrical casing (3) and a piston (4) displaceably mounted therein. The casing and/or the piston are adapted (5) for permanent connection to a pressurized fluid conduit, and the piston has a through opening (9) permitting the flow of pressurized fluid to the pipe nipple (2). According to the invention, one (e.g. the piston (4)) of the axially movable portions is provided with a thread dimensioned to be screwed into engagement with the thread of the pipe nipple (2), whereas the other portion (e.g. the casing 3), at its axial end surface, has a ring gasket (8) dimensioned to seal against the axial end surface of the pipe nipple upon screwing said one portion (4) into engagement with the pipe nipple and displacing the other portion (3) axially against the pipe nipple (2). (FIG. 1)

5 Claims, 2 Drawing Figures

QUICK COUPLING DEVICE

The invention relates to a quick coupling device.

Such a quick coupling device can be used for temporary connection of a pressurized fluid conduit, such as a hose, to the end of a pipe or a pipe nipple, e.g. belonging to an armature, a vessel for pressurized fluid or the like. Such a connection is especially useful when performing tightness tests or leak detection operations, wherein the armature, the vessel or the like is supplied with pressurized air or some other pressurized fluid during a prescribed, usually rather short time period, so that a large number of objects can be tested per time unit.

A previously known quick coupling device comprises a cylindrical casing and a piston mounted for displacement therein, the casing and the piston being adapted for permanent connection to a pressurized fluid conduit, and the piston having a through opening permitting the flow of pressurized fluid to the pipe nipple. When the piston is actuated, a sealing sleeve consisting of elastic material is axially compressed, so that the latter expands radially and thereby seals against the cylindrical wall of the pipe.

In certain cases, it may be less suitable or even impossible to achieve such a radial sealing effect, e.g. when using a pipe nipple which is threaded internally as well as externally.

Therefore, the object of the invention is to develop the known device further in such a way that an effective sealing effect can be achieved even for nipples provided with threads.

Thus, according to the invention, the quick coupling device is screwed into or onto the pipe nipple, so that a mechanical connection is obtained, whereupon the pressurized fluid sealing is achieved by a relative axial displacement of the cylindrical casing and the piston, so that a ring gasket is pressed axially against the end surface of the pipe nipple.

The invention will be described further below with reference to the drawings.

Figure 2:
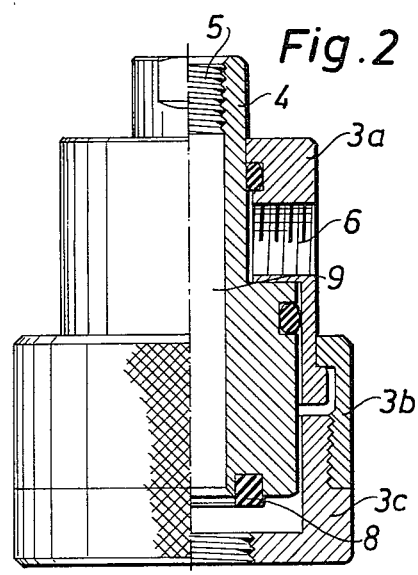

FIG. 1 is a central section through a first embodiment of the quick coupling device according to the invention; and FIG. 2 illustrates in like manner a second embodiment.

The quick coupling device shown in FIG. 1 is intended to be connected to a vessel 1 provided with a pipe nipple 2 secured by welding and having an internal thread. The device comprises a cylindrical casing 3, in which a piston having two parts 4a, 4b is displaceably mounted. The casing 3 has a radial bore 5 with a thread for permanent connection of a pressurized fluid hose (not shown) and another radial bore 6 with a connecting channel 7 intended to be connected to an actuating pressurized fluid hose (not shown) and which communicates with the wider cylindrical portion inside the casing 3 axially between the wall of the casing and the piston portion 4a. By applying an actuating pressure, the casing 3 and the piston 4a, 4b will be displaced axially relative to each other. This axial displacement is used to achieve the desired sealing effect. Thus, the piston portion 4b, which is provided with an external thread at its outer end, is first screwed somewhat into the nipple 2 (which can be done easily by hand by means of the knurled handle 4c of the piston); then the actuating pressure is applied so that the casing 3 is pressed axially against the pipe nipple and a ring gasket 8 seals at the end surface of the pipe nipple 2. The piston portion 4b has a through opening 9 communicating with the bore 5 of the casing 3 and consisting of an axial bore and four radial holes. Thus, in this position, the pressurized fluid hose or the like will communicate with the nipple 2 and the vessel 1.

FIG. 2 shows an embodiment of the device intended to be screwed onto an externally threaded pipe nipple. In this case, the device must be provided with an internal thread, and the latter is formed in the casing, which consists of three parts 3a, 3b and 3c. The piston 4 is made in one piece and has an axial through opening 5,9, and a pressurized fluid hose can be connected to the upper end 5, while the actuating fluid may be supplied via an opening 6 in the casing portion 3a.

In order to connect the device to an externally threaded pipe nipple, the casing 3 is screwed onto the nipple, whereupon the piston 4 is actuated so as to be displaced downwards and the ring gasket 8 is pressed sealingly at the end surface of the pipe nipple.

The invention can be modified in several ways within the scope of the inventive idea. Thus, the piston 4 can be actuated by some means other than a pressurized fluid, e.g. by means of a mechanical lever mechanism. Furthermore, the piston or casing portion 4b or 3c, respectively, on which the thread is formed, can be made exchangeable by a corresponding portion having a different diameter or type of thread so as to permit adjustment to various pipe nipple dimensions and types of thread.

I claim:

1. A quick coupling device for a fluid-tight temporary connection to a threaded pipe nipple having an axial end surface located in a substantially radial plane relative to the axis of the nipple, said device comprising:
    (a) a substantially cylindrical casing;
    (b) a piston displaceably mounted in said casing; said parts being axially movable relative to each other, said piston having a through passage permitting the flow of pressurized fluid to said nipple;
    one of said parts (a) and (b) being provided with a thread dimensioned to be screwed into engagement with the thread of the pipe nipple by relative rotation of said one part and said nipple, the other part being adapted to be permanently connected to a pressurized fluid conduit;
    (c) and a seal at the axial end surface of said other part and dimensioned to seal against said axial end surface of the pipe nipple,
    said casing and said piston defining therebetween an actuating chamber for connection to a source of fluid under pressure to achieve relative displacement of said two parts, said actuating chamber being without fluid connection to said through passage, an effective sealing between the coupling device and the nipple being achieved by first screwing said one part into threaded engagement with said nipple and then applying said actuating fluid to said actuating chamber.

2. A quick coupling device as claimed in claim 1, wherein said one part is the piston, the thread of the piston being external, and the seal being inserted into a ring groove in the axial end surface on the cylindrical casing.

3. A quick coupling device as claimed in claim 1, wherein said one part is the cylindrical casing, the thread of the cylindrical casing being internal, and the seal being inserted into a ring groove in the axial end surface of the piston.

4. A quick coupling device as claimed in any one of claims 1 to 3, wherein the thread of the device is formed at an exchangeable portion of said one part to permit adjustment to various pipe nipple dimensions and types of thread.

5. A coupling device according to claim 1, wherein said pipe nipple has an internal thread, and said one part is said piston provided with an external thread for threaded engagement with said internal thread, said through passage of said piston communicating with a bore in said casing for permanent connection to a pressurized fluid conduit.

* * * * *